United States Patent [19]

Brame

[11] Patent Number: 5,365,590
[45] Date of Patent: Nov. 15, 1994

[54] SYSTEM FOR PROVIDING ACCESS TO DIGITALLY ENCODED COMMUNICATIONS IN A DISTRIBUTED SWITCHING NETWORK

[75] Inventor: Charles P. Brame, Forest, Va.

[73] Assignee: Ericsson GE Mobile Communications Inc., Lynchburg, Va.

[21] Appl. No.: 47,834

[22] Filed: Apr. 19, 1993

[51] Int. Cl.$^5$ .............................................. H04L 9/00
[52] U.S. Cl. ......................................... 380/49; 380/9; 370/58.1; 370/85.1; 370/95.3; 370/97; 455/7; 455/33.1; 455/53.1; 455/54.1; 379/59; 379/338
[58] Field of Search .......................... 380/9, 34, 43, 49; 375/1,3,4; 370/581., 85.1, 95.3, 97; 379/59, 60, 242, 250, 258, 284, 338, 339; 455/7, 9, 11.1, 20, 33.1, 53.1, 54.1

[56] References Cited

U.S. PATENT DOCUMENTS

| | | | |
|---|---|---|---|
| 3,673,335 | 6/1972 | Joel, Jr. .............................. | 379/250 X |
| 3,912,873 | 10/1975 | Skaperda ........................ | 379/284 X |
| 4,009,343 | 2/1977 | Markey et al. ..................... | 370/95.3 |
| 4,201,893 | 5/1980 | McLaughlin ...................... | 370/58.1 |
| 4,535,444 | 8/1985 | Falzone et al. .................... | 370/58.1 |
| 4,675,863 | 6/1987 | Paneth et al. ..................... | 379/59 X |
| 4,901,307 | 2/1990 | Gilhousen et al. ................. | 375/1 X |
| 4,972,479 | 11/1990 | Tobias, Jr. et al. ................ | 380/9 X |

*Primary Examiner*—Bernarr E. Gregory
*Attorney, Agent, or Firm*—Nixon & Vanderhye

[57] ABSTRACT

A distributed switching network (switch) routes audio and control signals throughout the switch from various audio sources to one or more audio destinations. Audio sources such as mobile/portable radio units (via RF repeater transmitters), dispatch consoles, and landline telephone subscribers (via the central telephone switching network) are preassigned and routed onto an audio channel (i.e. a time slot) on a time division multiplexed (TDM) audio bus through a corresponding interface module. These interface modules broadcast digitized audio and data signals to all other interface modules over their preassigned TDM bus slot. Audio routing is performed to the audio destinations through corresponding interface modules that selectively "listen" to active TDM network channels. A digital voice interface module is provided in the switch to permit audio sources/destinations otherwise lacking certain digital processing capabilities (e.g. encryption/decryption) to participate in such digitally based calls. As a result, console operators and/or landline telephone subscribers may originate and receive digitally encoded calls without themselves having digital encoding/decoding capabilities.

25 Claims, 9 Drawing Sheets

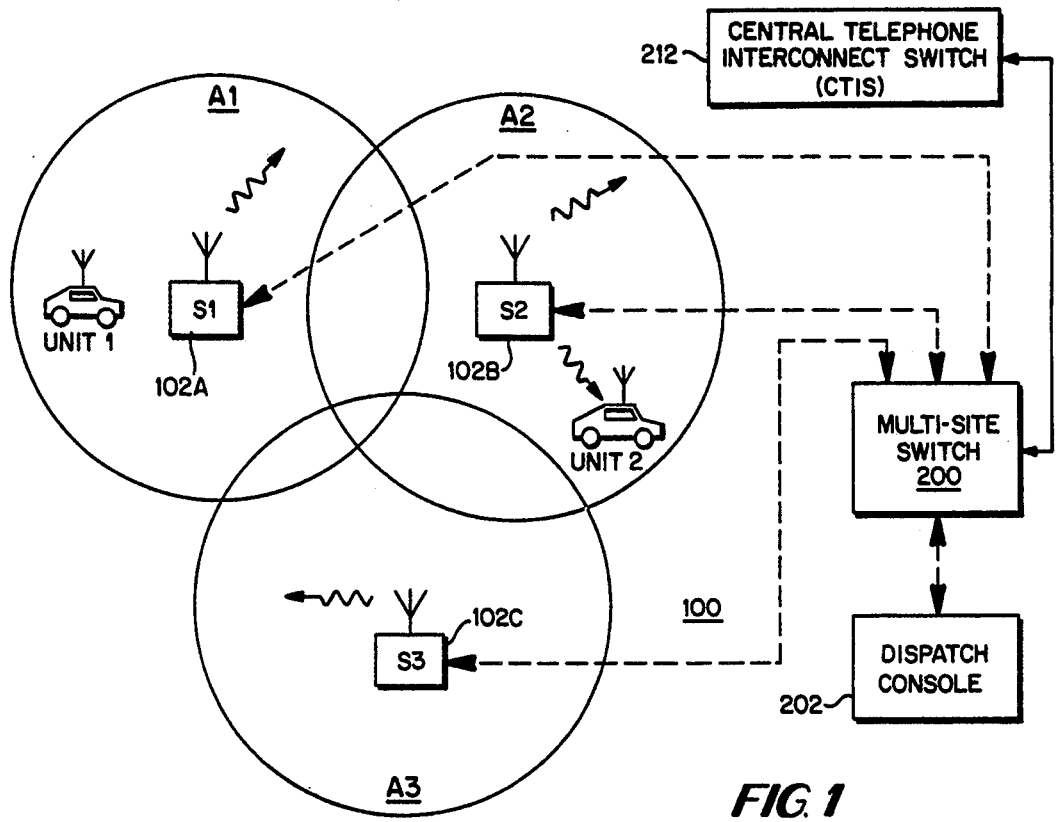
FIG. 1
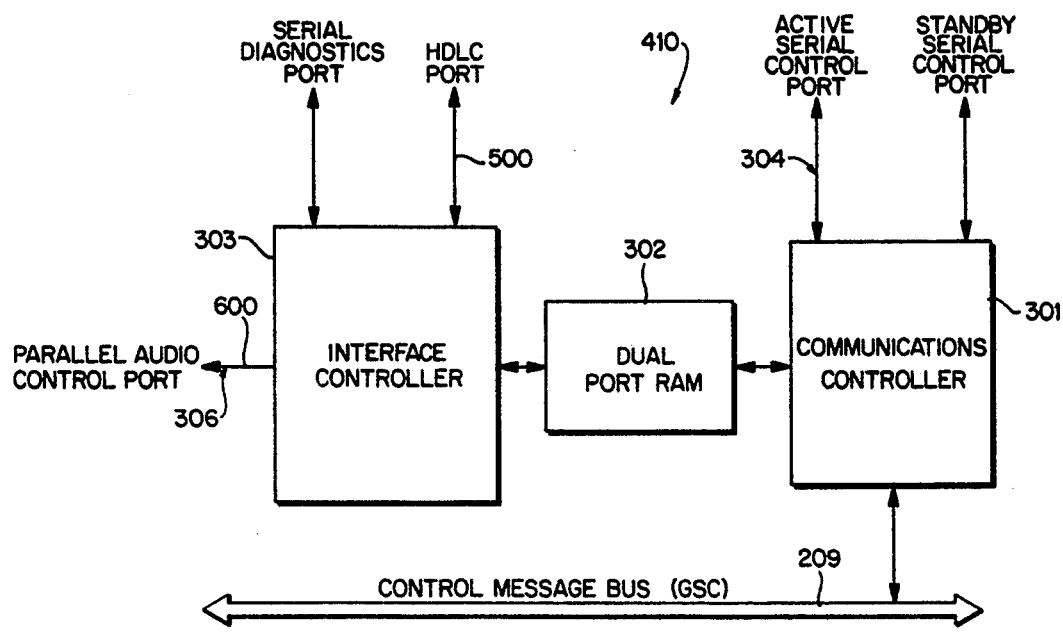
FIG. 4  SWITCH CONTROLLER CARD ARCHITECTURE

FIG. 2 MULTI-SITE ARCHITECTURE

AUDIO MODULE

SYSTEM FOR PROVIDING ACCESS TO DIGITALLY ENCODED COMMUNICATIONS IN A DISTRIBUTED SWITCHING NETWORK

FIELD OF THE INVENTION

The invention relates to a network of trunked radio transmission systems in which and audio signals from one system are switched through a distributed digital switching network to another transmission system. More particularly, the invention relates to providing the distributed switching network with the capability to permit different types of users of the network, including for example individual and groups of radio unit subscribers, dispatch console operators, and landline telephone subscribers, to process and participate in digitally encoded communications.

BACKGROUND AND SUMMARY OF THE INVENTION

Trunked RF repeater systems have become a mainstay of modern RF communications systems and are used, for example, by public service organizations (e.g., governmental entities such as counties, fire departments, police departments, etc.). Such RF repeater systems permit a relatively limited number of RF communications channels to be shared by a large number of users—while providing relative privacy to any particular RF communication (conversation). Typical state-of-the-art RF repeater systems are "digitally trunked" and use digital signals conveyed over the RF channels (in conjunction with digital control elements connected in the system) to accomplish "trunking" (time-sharing) of the limited number of RF channels among a large number of users.

Briefly, such digitally trunked RF communications systems include a "control" RF channel and multiple "working" RF channels. The working channels are used to carry actual communications traffic (e.g., analog FM, digitized voice, digital data, etc.). The RF control channel is used to carry digital control signals between the repeater sites and user RF transceivers (radio units) in the field. When a user's transceiver is not actively engaged in a conversation, it monitors the control channel for "outbound" digital control messages directed to it. User depression of a push-to-talk (PTT) switch results in a digital channel request message requesting a working channel (and specifying one or a group of callees) to be transmitted "inbound" over the RF control channel to the repeater site. The repeater site (and associated trunking system) receives and processes the channel request message.

Assuming a working channel is available, the repeater site generates and transmits a responsive "outbound" channel assignment digital message over the RF control channel. This message temporarily assigns the available working channel for use by the requesting transceiver other callee transceivers specified by the channel request message. The channel assignment message automatically directs the requesting (calling) transceiver and callee transceivers to the available RF working channel for a communications exchange.

When the communication terminates, the transceivers "release" the temporarily assigned working channel and return to monitoring the RF control channel. The working channel is thus available for reassignment to the same or different user transceivers via further messages conveyed over the RF control channel. An exemplary "single site" trunked RF repeater system is disclosed in the commonly-assigned U.S. Pat. Nos. 4,905,302 and 4,903,321.

Single site trunked RF repeater systems may have an effective coverage area of tens of square miles. It is possible to provide one or more satellite receiving stations (and a single high power transmitting site) if a somewhat larger coverage area is desired. However, some governmental entities and other public service trunking system users may require an RF communications coverage area of hundreds of square miles. In order to provide such very large coverage areas it is necessary to provide multiple RF repeater sites and to automatically coordinate all sites so that a radio transceiver located anywhere in the system coverage area may efficiently communicate in a trunked manner with other radio transceivers located anywhere in the system coverage area.

FIG. 1 is a schematic diagram of a simplified exemplary multiple-site trunked radio repeater system having three radio repeater (transmitting/receiving) sites S1, S2, and S3 providing communications to geographic areas A1, A2, and A3, respectively. Mobile or portable transceivers within area A1 transmit signals to and receive signals from site S1; transceivers within area A2 transmit signals to and receive signals transmitted by site S2; and transceivers within area A3 transmit signals to and receive signals transmitted by site S3. Each repeater site S1, S2, S3 includes a set of repeating transceivers operating on a control channel and plural RF working channels. Each site may typically have a central site controller (e.g., a digital computer) that acts as a central point for communications in the site, and is capable of functioning relatively autonomously if all participants of a call are located within its associated coverage area.

To enable communications from one area to another, however, a switching network referred to herein as a "multisite switch", must be provided to establish control and audio signal pathways between repeaters of different sites. Moreover, such pathways must be set up at the beginning of each call and taken down at the end of each call. For example, the site controller (S1) receives a call from a mobile radio in A1 requesting a channel to communicate with a specific callee. A caller requests a channel simply by pressing the push-to-talk (PTT) button on his microphone. This informs the site controller S1 via an "inbound" digital control message transmitted over the RF control channel that a working or audio channel is requested. The site controller assigns a channel to the call and instructs the caller's radio unit to switch from the control channel to the audio channel assigned to the call. This assigned channel is applicable only within the area covered by the site.

In addition, the site controller sends the channel assignment to the multisite switch 200 which assigns an internal audio slot to the call. The switch 200 also sends a channel request to other site controllers having a designated callee within their site area. Audio signals are routed such that audio pathways are created to serve the callee(s) and one or more dispatcher consoles 202 involved in the communication. Upon receiving a channel request, these "secondary" site controllers (in the sense they did not originate the call) assign an RF working channel to the call. Each secondary channel is operative only in the area covered by the secondary site controller. The secondary site controller(s) also sends the channel assignment back up to the multisite switch.

Thus, the caller communicates with a unit or group in another area via the multisite switch. The call is initially transmitted to the primary site controller, routed through an assigned audio slot in the switch, and retransmitted by the secondary sites on various assigned channels in those other areas. When the call ends, the primary site controller deactivates the assigned channel for that site and notifies the multisite switch 200 that the call is terminated. The multisite switch 200 propagates an end of call command ("channel drop") to all other site controllers. This releases all working channels assigned to the call and breaks the associated audio rating pathways.

In addition to providing communications between mobile radio units in different areas, the multisite switch 200 provides communications between land-line telephone subscribers and radio units as well as dispatchers and mobile radio units. Land-line telephone subscribers can communicate with radio units by dialing an access number as well as a radio unit (or group) identification number which is routed to the trunked communications system through a central telephone interconnect switch (CTIS) and the multisite switch 200. One or more dispatch consoles 202 is connected to the multisite switch 200 in the same manner as the site controllers 102. Both land-line subscribers and dispatch console operators can issue a channel call request through the multisite switch 200 to a site controller 102 to call for example a mobile radio unit.

Each dispatch console 202 may participate in calls in its area. Thus, when a call comes through the multisite switch 200 from another area to a mobile radio, the switch informs the dispatch console 202 of the call in addition to notifying the corresponding site controller 102. The dispatch operator can then listen or participate in the call. The multisite switch 200 also handles calls to groups of mobile units and/or dispatch consoles by ensuring that the site controllers for all of the callees in the group assign a channel to the group call.

The multisite switch 200 has a distributed architecture. The logical functions and computational workload of the multisite switch 200 are shared by various distributed microprocessor "nodes". Each node is connected either to a site controller 102, dispatch console 202, public and/or private landline telephone exchanges and other components of the overall radio system. The nodes are referred to herein as interface modules and include, for example, Master Interface Modules (MIMs) for the nodes coupled to site controllers and Console Interface Modules (CIMs) for the nodes coupled to dispatch consoles. Each interface module of the multisite switch is supported by a switch controller card operated by microprocessors. All of the cards have substantially the same hardware and are interchangeable. Each card acts as a gateway interface into the distributed switch network.

One of the significant advantages digital communications systems afford is the capability to digitally encode (e.g. encrypt) voice/data communications. This capability is particularly desirable and necessary for calls over RF channels which can be monitored by any suitably tuned radio receiver. Agencies and departments such as local police departments, in particular, require secure private RF communications. Mobile units and/or groups of mobile units can communicate securely over RF communications links using one or more assigned encryption/decryption "keys" in accordance with an encryption/decryption algorithim, (e.g. the DES) to encrypt the voice/data to be transmitted and decrypt the received information. Only those users having digital encryption/decryption capabilities and the necessary "key" can monitor or participate in the encrypted communication.

The interface modules in the multisite switch do not perform any encryption and decryption, instead, these operations occur at the radio units. Typically, the information is digitally encrypted/decrypted at the radio unit and communicated in that form directly over the audio network to/from the sites through the MIM modules. Unfortunately, some users of the multisite switch, such as dispatch console operators and land-line telephone subscribers, do not have digital encryption and decryption capabilities. As a result, a dispatch operator can not monitor, participate in or originate digitally encrypted calls. Similarly, even though a land line subscriber can access the trunked RF communication system for unencrypted or "clear" calls, that subscriber is unable to receive or originate encrypted calls.

The present invention overcomes these drawbacks by permitting users lacking digital encryption capabilities to nonetheless participate in encrypted communications over the multisite switch. More particularly, one or more digital voice interface modules (DVIM) similar in architecture and operation with other switch interface modules (e.g., CIM's and MIM's) are employed to digitally encode and decode calls for multisite switch "analog" type users lacking that capability.

Each DVIM includes plural digital voice interface units (DVIU) with each DVIU having a digital signal processor that digitally encodes information received from analog communications units over the switch via the DVIM and decodes digitally encoded information on the switch audio network to be received by those analog units. For encryption/decryption, each DVIU stores an assigned cryptographic "key" corresponding to a key employed by a particular radio unit or group of radio units to digitally encrypt/decrypt communications. One or more (including multiple pools of) DVIU's may be dedicated to a particular group or groups of radio units, or a DVIU may be assigned dynamically from a pool of available DVIUs. The DVIM selects (1) the DVIU with the appropriate key to handle a particular encrypted communication and (2) whether that DVIU should encrypt or decrypt the received information.

The present invention therefore permits one or more analog communication units to originate and receive digitally encoded calls without themselves each having digitally encoding/decoding capabilities. In other words, analog communication units do not need to be individually retrofitted with digital encoding/decoding hardware and software to participate in digitally encoded calls over the multisite switch. This is particularly advantageous to dispatch console operators because it allows plural communications, some of which may be digitally encoded, to be summed and monitored on a single speaker. Landline telephone subscribers also benefit from digitally encoded communications (e.g. by enhanced security) with radio units in the field simply by dialing, in addition to a system access number, a single key such as a # key to originate and participate in a digitally encoded call.

BRIEF DESCRIPTION OF THE DRAWINGS

These and other features and advantages of the present invention will become better and more completely understood by referring to the following detailed description of presently preferred exemplary embodiments in conjunction with the sheets of Figures, of which:

FIG. 1 is a schematic illustration of an exemplary "multi-site" trunked RF communications system;

FIG. 4 is a general block diagram of an exemplary architecture of the controller portion of the interface module shown in the FIG. 3;

DETAILED DESCRIPTION OF THE DRAWINGS

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well known methods and programming procedures, devices, and circuits are omitted so not to obscure the description of the present invention with unnecessary detail.

An exemplary trunked radio repeater system 100 in accordance with the invention is generally depicted and was described above in conjunction with in FIG. 1. In the preferred multisite system 100, for example, the site controller (S1) receives a call from a mobile radio in coverage area A1 requesting a channel to communicate with a specific callee or group of callees. The caller requests the channel simply by pressing the push-to-talk (PTT) button on the microphone of his remote RF transceiver. This informs the site controller (e.g., via an "inbound" digital control message transmitted over the RF control channel) that an audio working channel is needed. The site controller assigns a working channel to the call and instructs the caller's radio unit to switch from the control channel to the assigned working channel. This assigned working channel is thus ready to support communications within the area covered by the site.

In addition, the site controller sends a message indicating the channel assignment to the multisite network switch 200. The switch 200, in turn, sends a channel request to all other site controllers and routes audio signals such that an audio signal pathway is created between the RF repeater servicing the caller and the RF repeater(s) servicing the callee(s). Additional audio signal pathways may also be established in similar fashion such that one or more dispatch consoles 202 and land-line subscribers may become involved in the communication. Upon receiving a channel request, these "secondary" site controllers may each assign an RF working channel to the call (e.g., if a callee designated by the caller's channel request message happens to be physically located within the coverage area serviced by the associated RF transceiving site). Meanwhile, the switch 200 ensures that the caller's audio has been routed from the active RF receiver of site S1 to active transmitters of each of the other sites participating in the call.

Figure 2:
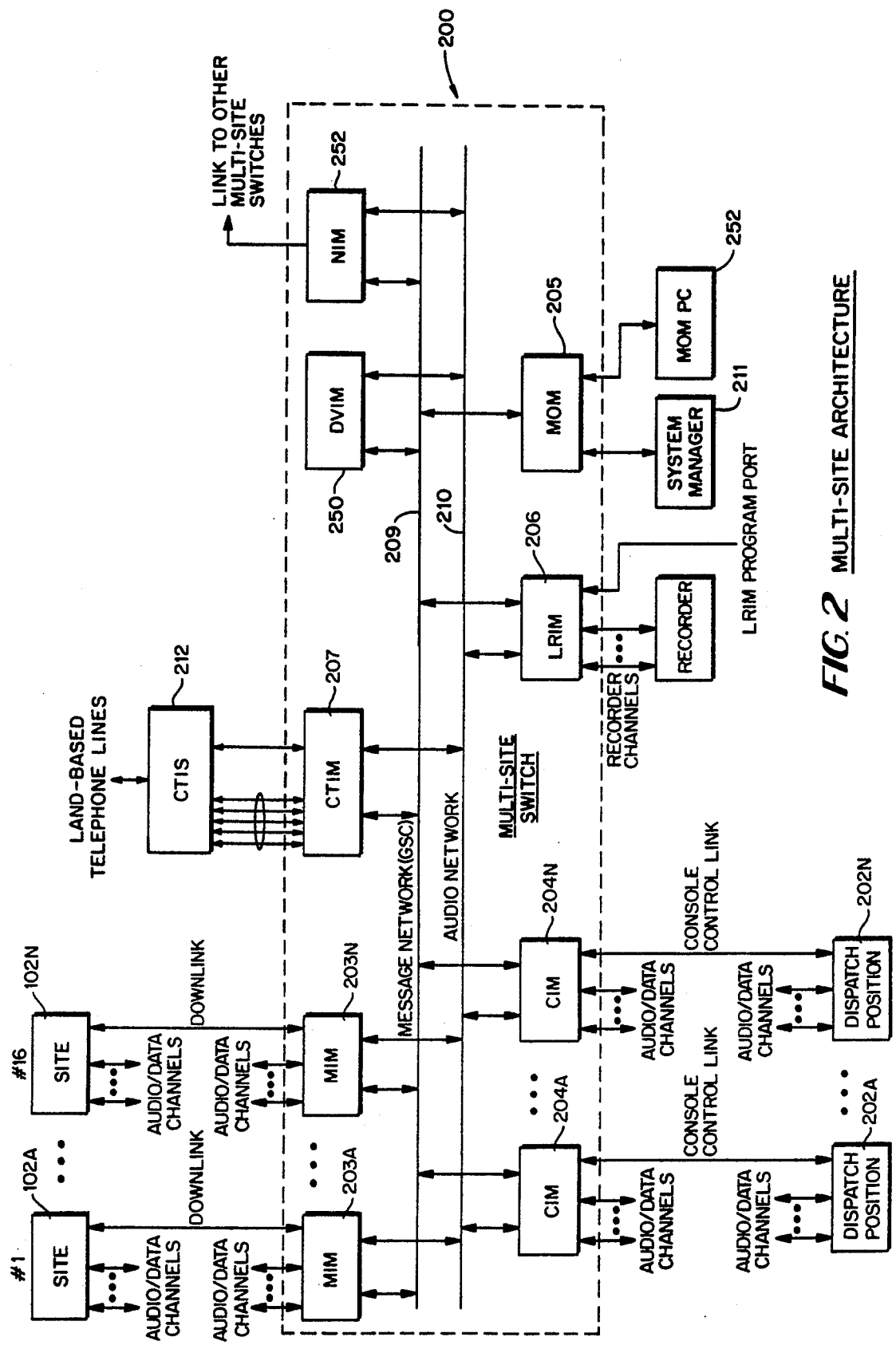
FIG. 2 is a schematic of an exemplary architecture for a distributed digitally trunked radio frequency communications system multisite switching network.

FIG. 2 is a detailed schematic diagram of the architecture of multisite switch 200 provided by the presently preferred exemplary embodiment of this invention. The multisite switch 200 communicates with each site controller 102 and dispatcher console 202 via data and audio communication lines.

The multisite switch 200 establishes and removes audio connections between sites 102 and dispatch consoles 204 using a local area network of interface modules (or nodes). As shown in FIG. 2, the interface modules are labelled corresponding to whether they interface with a site controller, dispatch console, landline telephone switch or other system component. For example, MIMs 203 are interface modules in the switch that interface with site controllers and CIMs 204 are interface modules that interface with dispatch consoles. There are other interface modules such as a Monitor Module (MOM) 205, Logging Recorder Interface Module (LRIM) 206, Central Telephone Interconnect Module (CTIM) 207, a Digital Voice Interface Module (DVIM) 250, and a Network Interface Module (NIM) 252. The MOM 205 is the interface for the system manager 211 and the MOM PC (personal computer) 252 that have supervisory responsibility for the switch 200 and overall radio system.

Each interface module in the multisite switch is supported by a microprocessor based controller module. All of the modules (the MIMs, CIMs, CTIM, MOM, RIM, SWIM, DVIM, and NIM) have the same hardware and are interchangeable. The modules have different "personalities" to indicate that they are assigned to, for example, a site controller or a dispatch console, etc. Each module can be easily configured to be a MIM, CIM, etc. by setting a few switches.

The interface modules of the switch 200 are connected to a digital message bus 209 and a digital audio (TDM) network 210. The message bus 209 is shown in FIG. 2 as a message network using a conventional GSC digital messaging protocol as implemented by the Intel 80C152 Global Serial Channel (GSC) microprocessor. Such a GSC microprocessor is used as the communications controller the controller module in each interface module. The message bus 209 is a high speed data bus that interconnects the interface processors in the controller of each interface module.

The audio bus 210 comprises 32 time division multiplexed (TDM) buses in the preferred embodiment. Each bus contains 32 slots, each slot corresponding to a single audio channel. A maximum of 1024 audio slots may be routed through the switch (32 buses×32 slots), although some of the slots are used for other purposes (e.g. signalling). In the preferred embodiment, 240 channels of digitized audio are carried by audio TDM network 210.

The MOM 205 is the interface module for the system manager 211 and the MOM PC (personal computer) 250. The system manager 211 updates databases maintained in all of the interface modules. The MOM 205 maintains certain centralized databases including databases for smart calls and confirmed calls. Smart calls relate to the operation of the dispatch console 202. A call is "smart" if the call is selected by the dispatcher via a select speaker in the console 202. A confirmed call is one for which the audio channel and slot assignments must be confirmed before the caller begins talking. The system manager 211 sets which calls are to be confirmed and provides this information to the site controllers 102. The channel assignment message for the originating call from the primary site controller instructs the multi site switch that the call is to be confirmed. When the MOM 205 receives a message that a confirmed call is requested, it tells the primary MIM which secondary MIMs must confirm the call by sending a "site mask" to the primary MIM. The site mask identifies each secondary MIM to participate in the confirmed call.

The LRIM 206 interfaces recorders to the switch assigned to log calls for various groups or units. The CTIM 207 functions much the same as a MIM does with respect to interfacing a site to the switch except that it interfaces to landline telephone lines from the CTIS to switch 200. NIM 252 interfaces one switch 200 to another multisite switch to provide even greater coverage. Using NIM 252 any number of switches can be connected.

As part of the switch initialization procedure, the interface modules connect their assigned TDM bus slots to the module's external channel inputs. For example, a MIM will assign each channel from its site controller to a separate audio TDM bus slot on audio network 210. Once the TDM bus slot is linked to the site channel, the bus slot continuously receives the output from the channel through the host node without further channel setup required. Of course, the site channel has no intelligible signal until it is assigned to a call by the site controller. Although a TDM bus slot is linked to a corresponding site channel, no other interface modules (MIM, CIM, etc.) listens to that bus slot until the host interface module sends a slot assignment message throughout the multisite switch 200 over the message network 209 notifying the interface module nodes that an active call from the site has been assigned to that bus slot.

Figure 3:
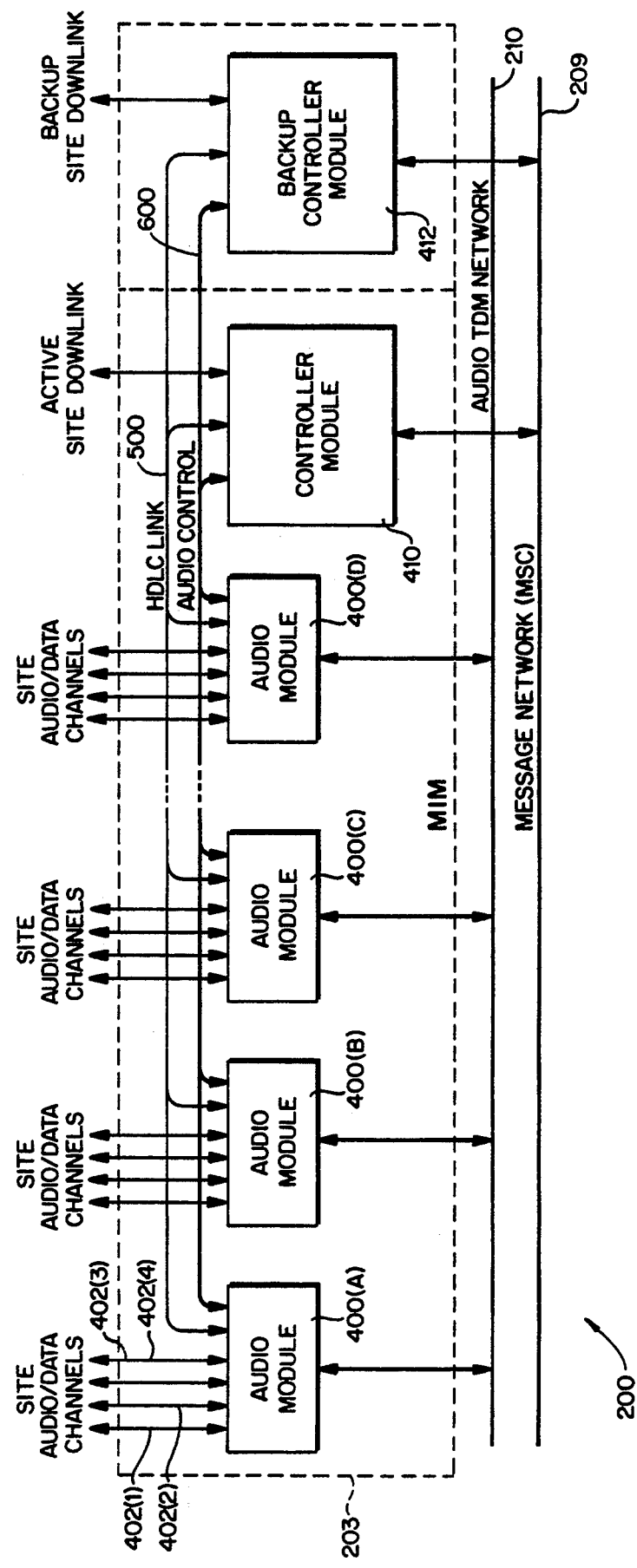
FIG. 3 is a detailed block diagram of a single exemplary interface module (providing multiple audio sources/destinations) shown in FIG. 2.

FIG. 3 is a high level block diagram of a single (multiple audio channel) exemplary MIM 203 provided by the presently preferred exemplary embodiment of this invention. The architecture of other interface modules, e.g. CIM, DVIM, and CTIM, is virtually the same as that for the MIM. As mentioned above, the "highway" used to communicate signals between interface modules includes an audio (TDM) network 210 and a control message network ("GSC") 209. The audio TDM network 210 handles digitized audio signals irrespective of whether they are unencrypted (e.g. "clear voice") or digitally encrypted. The TDM audio bus simply transfers whatever digital information is placed on the TDM bus slot. Because each TDM bus provides multiple time "slots", MIM 203 typically services multiple RF channels providing multiple audio source/destinations each of which are connected independently to a TDM bus slot.

MIM 203 includes a controller module 410, a backup controller module 412, and plural (preferably eight) audio modules 400 (only four are shown for purposes of illustration). Each audio module 400 in the preferred embodiment is connected to a maximum of four RF repeaters of an RF trunking site, or in the case of a CIM and a CTIM (for console and landline communications) to four bidirectional audio links. For example, audio module 400(A) includes bidirectional audio links 402(1)–402(4) serving associated first through fourth trunked RF repeater site "channels" (i.e., RF transceiving/repeating decks associated with particular trunked RF channels). As described in more detail below, the audio modules 400 act as source gateways ("entrance/exit ramps") which convert analog audio signals generated by MODEMs from the trunked repeater sites into digitized audio signals (PCM) and place the digitized audio signals onto the audio TDM network 210. These same audio modules 400 act as audio destinations by taking selected signals from the audio TDM network 210, converting them from digital into analog form, and providing the resulting analog signals to the RF repeater site "channels" for transmission via RF links.

The controller module 410 communicates with each of the four audio modules 400 via a common HDLC link 500 and an audio control link 600. The HDLC link 500 is used, for example, to carry fault indications and messages relating to RF "channel" status between the audio modules 400 and the controller module 410. Audio control link 600 permits the controller module 410 to set low-level parameters (e.g., level adjustment, TDM slot assignment, etc.) within each audio module 400.

FIG. 4 shows a block diagram of an exemplary architecture for controller 410. Each controller 410 includes a communications controller 301, a dual-port random-access-memory (RAM) 302 and an interface processor 303. The communications controller 301 routes and receives control messages between the control message bus 209 and the interface processor 303. The dual-port RAM 302 is used to communicate between the communications controller and the interface controller 303. The communications controller 301 may be an Intel 80C152 GSC microprocessor. Messages received from the site controller 102 over the serial port 304 are translated into a format usable by the multisite switch. The communications controller also translates switch messages into a format that the site controller or console understands.

The interface processor 303 performs substantially all the logical functions for the interface modules MIM, CIM, DVIM, etc. and is effectively the "intelligence" of the MIM 203. Interface processor 303 (which may be an Intel 80C186 microprocessor) initially assigns TDM bus slots channels to the individual RF transceivers associated with audio links 402(1)–402(4) of audio modules 400 using parallel audio control bus 600. The interface processor 303 connects audio slots to the site controller, dispatcher console, or CTIS to establish a communications link for a call and also terminates that link when a call ends. As previously described, each MIM is preassigned a set of TDM bus slots for outputting audio signals onto the TDM bus, and these slots are not assigned and de-assigned during the course of normal call routing.

Each call through the switch is patched to its assigned TDM bus slot on the audio bus 210. When the call ends, that slot is made available for assignment to another call. Since the interface controller 303 for each interface module assigns slots, connects audio slots to the site controller or dispatch console to establish a communications link, and terminates calls, the interface modules must continually inform each other of their slot assignments. Accordingly, the interface modules send control messages regarding slot assignments, slot updates and slot idles over the control message network 209 to other interface modules.

The communications controller 301 for each interface module initially processes all of the messages on the message network. Slot assignments are forwarded to the interface processor 303 through the dual-port RAM 302. The communications controller 301 processes slot update and slot idle messages by referring to a slot bit "map" or database located and maintained in the dual-port RAM 302 for all TDM bus slots on the audio bus 210. By referring to the slot bit map, the communications controller 301 determines whether the slot status message conveys information already known, or if the slot status message conveys new information about a TDM bus slot. Update messages are sent regularly by the interface modules hosting calls to confirm to the other interface modules the active status of a slot. When a host interface module terminates a call, it sends a slot idle message to the other nodes and also periodically resends idle messages until the slot is reassigned to another call. Thus, all interface modules are continually informed of the status of all TDM bus slots that have been assigned at least once. A more detailed description of the slot bit map and slot status messages is provided in application Ser. No. 07/658,640 filed on Feb. 22, 1991 entitled "Message Bus Slot Update/Idle Control and RF Trunking Multisite Switch" which is incorporated herein by reference.

Each MIM is coupled to its site controller through a standard serial telephone line. MIMs receive digital command signals from their site controllers 102 through a downlink line as is described in commonly assigned U.S. Pat. No. 4,835,731, entitled "Processor-To-Processor Communications Protocol For A Public Service Trunking System" also incorporated by reference.

Each MIM also maintains a radio unit database that identifies the radio units within its site and the groups that correspond to active calls. These databases are set up by the system manager 211 and sent to all interface modules. The radio unit database identifies each mobile radio unit in the wide area system. For each MIM, some of the mobile units will be in its assigned site area and others will be outside of its area. Each MIM keeps track of which units are in its area and which group(s) is currently selected by the unit. Since each mobile unit may be capable of participating in several different groups, the mobile unit operator selects the desired group at any particular time. Whenever a call comes in for the selected group, then the unit will receive the call.

The MIMs also maintain a group database. A group is a collection of units that communicate together on a single call. For example, there may be a group for the fire department that allows all of the fire trucks to listen to the central dispatcher or the fire chief. The dispatcher dials this group, into his console to broadcast messages to all fire trucks. Similarly, groups can be established for rescue stations, police units assigned to a particular precinct, and many other combinations of users of the public service radio system.

When a unit enters a new site area, a log-in message is sent from its new site controller to the corresponding MIM identifying the unit and its currently selected group(s). The MIM receiving the login signal through its serial control port 304, i.e. from the site controller via the downlink, increments the group "count" for the unit's selected group. Similarly, when a unit leaves an area, the corresponding MIM logs the unit out of its group count database by decrementing the count of the unit's current group. In addition, when a unit changes groups, it sends a group login message that causes the MIM for its area to increment the count for the newly selected group and decrement the count of the old group.

The procedures followed by the multisite switch 200 in activating a call from a radio unit and from a dispatcher console, confirming receipt of the call request, and terminating the call are now described.

A "primary" MIM receives a radio unit originated channel assignment from its corresponding site controller. This signal indicates that a mobile unit in the area assigned to that MIM wants to call another unit or a group and its site controller has assigned a channel to the call for its area. The MIMs assigned to callees are "secondary" MIMs. The channel assignment is sent to the multisite switch as described above and received in the MIM by the communications controller 301 as are all communications from outside of the multisite switch. The MIM translates the site channel assignment into a TDM bus slot assignment for use within the multisite switch and that the slot assignment is sent to all other interface modules and components. The primary MIM logs that TDM bus slot (i.e. channel) as active and the MIM performs an updating task sending slot update messages to the other interface modules.

More specifically, the MIM responds to the radio originated TDM bus slot assignment by sending messages on the multisite switch message bus 200. A TDM slot assignment message is sent to all switch components identifying the TDM bus slot on the audio bus 210 that is assigned to the call. Upon receipt of the slot assignment message, each CIM 204 looks through its database to determine if the callee is programmed at its corresponding console 202. If the callee is programmed and the channel assignment message indicates that the audio is not encrypted, the CIM 204 connects its corresponding dispatch console 202 to the audio slot for the call. In this way, the dispatch console can monitor all unencrypted calls involving groups or units that have been programmed by the dispatcher. The MOM 205 sets up group calls, informs CIMs of smart calls, and tracks which calls have been "selected" by a dispatch console. The secondary MIMs receive a TDM bus slot assignment and a slot update from the primary MIM. Each MIM checks its unit database to determine whether the callee(s) is listed as being in its area. If the callee(s) is not in its area, then the MIM does nothing. If there is a callee(s) in its area, the MIM is designated as a secondary MIM and sets the assigned TDM bus slot bit (or clears the bit if the slot assignment says the channel is dropped) on the bit map maintained in its RAM 302 to stop subsequent updates from being sent to the interface processor 303.

A detailed description of the messaging and protocols involved in the call setup and takedown procedures is provided in commonly assigned U.S. patent application Ser. No. 07/658,844 filed on Feb. 22, 1991 entitled "Distributed Multisite Switch Architecture," the disclosure of which is incorporated herein by reference.

Figure 5:
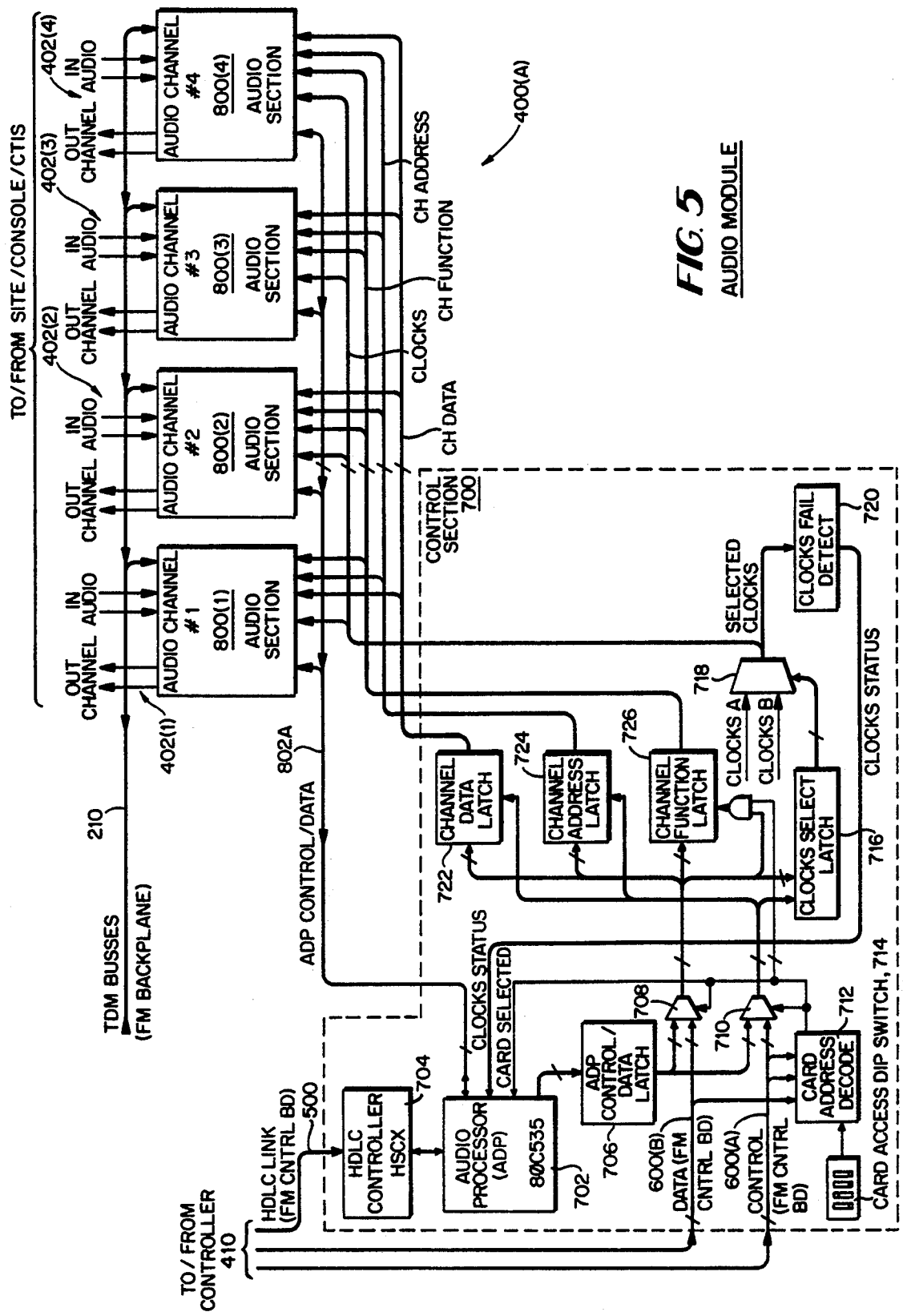
FIG. 5 is a more detailed block diagram of an exemplary audio module shown in FIG. 3.

FIG. 5 is a detailed schematic block diagram of one of the audio modules 400 shown in FIG. 3. Audio module 400 includes plural (four in the described embodiment) audio channel sections 800 and a control section 700. Each of the four audio channel sections 800 routes audio between a single bidirectional audio link 402 (e.g., the audio input and output of an RF repeater transceiver, a console "channel" or a telephone land-line) and the audio TDM network 210. Thus, each audio channel section 800 has an audio "in" or source terminal for receiving analog audio signals (e.g. from a dispatch console, an RF receiver located at a site, or a telephone landline); and an audio "out" or destination section for outputting analog audio signals (e.g. to the console or the audio input of an associated RF transmitter located at the site). Audio links 402 may comprise direct wire connections, telephone twisted pairs, or channels on a T1 microwave link—depending, for example, upon the geographical location of the transceiving site relative to the switch. In the preferred embodiment, audio links may be a balanced pair telephone line which carries audio signals between RF repeater sites, console "select" loudspeakers, and/or publically switched telephone lines, and the audio section 800 in the MIM, CIM, CTIM, and DVIM.

Control section 700 provides control and clock signals to audio channel sections 800, and also provides an interface to controller module 410. The heart of the preferred embodiment control section 700 is a processor 702 (type 80C535) and associated HDLC controller/interface 704 (e.g., a type 82525 IC), a control/data (multiplexer selected) latch 706, a data multiplexer 708, and a control signal multiplexer 710. Processor 702 and controller module 410 may provide overlapping (and in some cases redundant) control capabilities. Controller module 410 and processor 702 communicate with one another via HDLC link 500, HDLC controller/interface 704, and interface controller 303. In addition, control module 410 provides control and data signals via audio processor control bus 600 (which in the preferred embodiment includes an 8-bit parallel control bus 600A and an 8-bit parallel data bus 600B).

Control registers 722-726 provide control signals to audio sections 800. In the preferred embodiment, these control registers include a channel data latch 722, a channel address latch 724, and a channel function latch 726. The channel address latch 724 in the preferred embodiment stores a four-bit address field wherein each of the four bits corresponds to an associated audio channel section 700. Thus, the channel address latch 724 is used to select (via a CH ADDRESS bus) which of the four audio channel sections 800(1)-800(4) is to perform the function specified by the control signals latched in the channel function latch 726. Channel function latch 726 provides parallel control signals to audio sections 800(1)-800(4) via a CH FUNCTION bus, each of the control signals specifying a different function to be performed by the audio processor section 800 specified by the contents of the channel address latch 724. Channel data latch 722 stores an 8-bit data word that is provided to each of audio sections 800 via a CH DATA bus. The significance and usage of this data word provided by the channel data latch depends on the function selected by the contents of channel function latch 726.

Controller 410 can write to control registers/latches 722, 724 and 726 within control section 700 by transmitting the address of the audio module 400 onto address/data bus 600B and by transmitting additional appropriate control signals onto the control bus 600A. The address of the audio module 400 is set by a card address DIP switch 714 in the preferred embodiment, and the address signals are decoded by card address decode logic 712 (preferably a digital comparator and associated gates and flip flop for synchronization). When controller 410 asserts the address set by DIP switch 714 onto address/data bus 600B, multiplexers 708, 710 are controlled to select the controller module control and data buses 600 for output to control registers 722-726.

Processor 702 performs routine control functions associated with audio sections 800 such as generating chip select and read/write signals, illuminating status indicators, controlling the levels set by electronic potentiometers and selectively bypassing same, sensing failure modes such as clock generator failure, etc. Such routine control signals are provided by processor 702 to audio sections 800 via signal lines.

Clock select latch 716 and multiplexer 718 are used to select between redundant sets of master clocking signals common to the entire switch 200 in response to the clock select enable bit of control bus 600A (master clocking of the audio sections 800 is necessary to ensure that each audio section is synchronized with the TDM bus). MUX 718 performs such selection between clocks under control of a control signal outputted by MUX 710. The selected clocking signals are provided to the audio sections 800 via the "clocks" line. A "clocks fail" detection block 720 permits processor 702 to detect whether the master clocking signals are reaching the audio sections 700.

Audio section 800 includes "incoming audio" (source) processing circuitry that processes and digitizes audio coming in from the RF site and places the digitized audio on the audio TDM network and also includes "outgoing audio" (destination) processing circuitry that takes selected digitized audio signals from the audio TDM network, converts the digitized audio signals into analog signals, and sends the resulting audio signals to the RF site for transmission. The interface between the "source" and "destination" portions of audio section 800 is the audio TDM network 210 itself. As described above, the "source" portion of audio section 800 is preassigned a TDM bus number and bus slot (via controller 410 at time of power up), and continually broadcasts digitized audio signals over the TDM network (regardless of whether or not audio is coming in from the site RF receiver or console).

Figure 6:
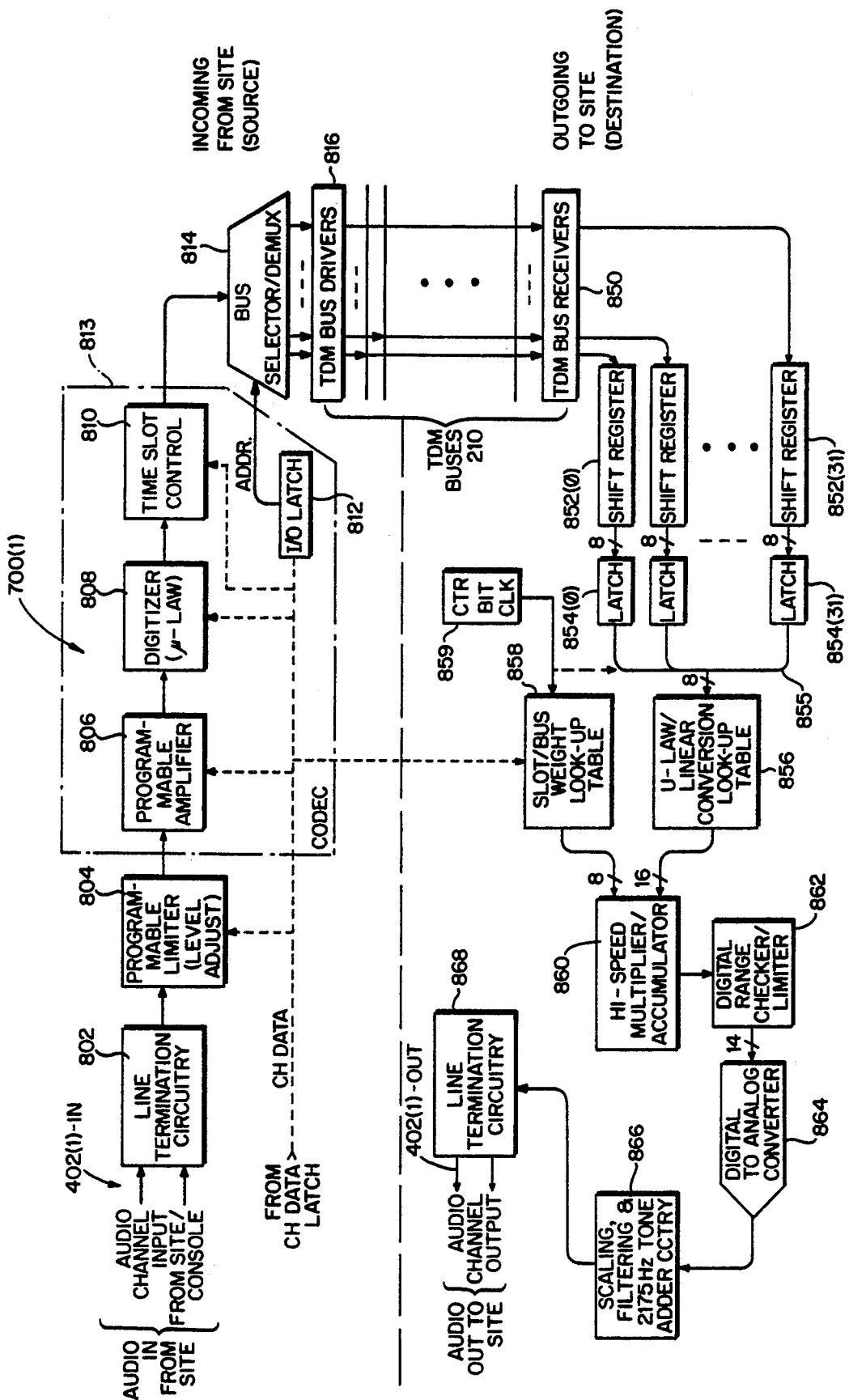
FIG. 6 is a detailed schematic diagram of the circuitry associated with an exemplary audio channel section shown in FIG. 5.

FIG. 6 is a detailed schematic diagram of an exemplary audio section 800 provided by the presently preferred embodiment of this invention. Audio section 800 includes "incoming audio" (source) processing circuitry that processes and digitizes audio coming in from the RF site and places the digitized audio on the audio TDM network (this circuitry is shown above the dashed horizontal line of FIG. 6); and also includes "outgoing audio" (destination) processing circuitry that takes selected digitized audio signals from the audio TDM network, converts the digitized audio signals into analog signals, and sends the resulting audio signals to the RF site for transmission, to a dispatch console, to the central telephone interconnect switch 212, and/or to Digital Voice Interface Units (DVIU) for processing (this circuitry is shown below the FIG. 6 dashed horizontal line). The interface between the "source" and "destination" portions of audio section 800 is the audio TDM network 210 itself.

The "source" portion of audio section 800 is preassigned a TDM bus number and bus slot (via controller 410 at time of power up), and continually broadcasts digitized audio signals over the TDM network (regardless of whether or not audio is coming in from the site RF receiver). In the preferred embodiment, this source portion includes a line termination circuit 802, a programmable limiter (level adjustment) block 804, a programmable amplifier 806, a digitizer 808, a time slot control block 810, an I/O latch 812, a bus selector/demultiplexer 814, and a TDM bus driver block 816.

A balanced pair (e.g., a telephone line) 402(1)-IN is used to carry audio signals from the RF repeater site to audio section 700. This balanced pair 402(1)-IN is coupled through to conventional balanced line termination circuitry 802 to a programmable level adjust block 804, which may be an electronic potentiometer serially loaded by audio processor 702 with a data word specifying a programmable amount of attenuation (commands for such programmable attenuation adjustment may be communicated from controller 410 to audio processor 702 via HDLC link if desired).

The output of block 804 is provided to a programmable CODEC device 813 the first stage of which is an audio compression amplifier/limiter 806 used to provide an audio signal of relatively uniform average high level. The output of compression amplifier 806 is provided to the input of a conventional µlaw PCM codec/digitizer 808. The digitizer 808 provides its output to demultiplexing network 814 for application (via a conventional buffer/bus driver 816) to TDM network 210. Controller 410 can write instructions to codec 808 via channel function latch 726 and channel address latch 724. A programmable I/O latch 812 controls which TDM bus the serialized codec 808 output is applied to by the demultiplexer 814. Time slot control 810 is loaded with the output of the channel data latch 722 (via the CH DATA bus) at the time of system power up or reset, for example—thereby assigning a bus slot for exclusive use by the audio section 800.

Thus, the source portion of audio processor 800 continually (i.e., every frame) outputs digitized audio signals onto TDM network 210 (on a preassigned TDM bus during a bus slot preassigned to it). Slot assignment messages for active calls specify a TDM bus slot and radio transceiver group information causing all MIMs, CIMs, DVIMs, etc. that need to be involved with a call to begin "listening" to the appropriate TDM bus slots, to convert the digitized audio signals contained in those slots into analog audio signals, and to provide the analog audio signals to an RF repeater, console, or landline assigned to handle the call.

The "destination" portion of audio section 800 includes TDM bus receivers 850, a bank of shift registers 852 and associated latches 854, a (e.g., read only) µlaw-to-linear conversion lookup table, a (read/write) slot/bus weight lookup table 858, a high speed multiplier/accumulator 860, a digital range checker/limiter 862, a digital to analog converter (DAC) 864, additional scaling, filtering and tone generation circuitry 866, and a line termination circuit 868. TDM bus receivers 850 receive signals from all TDM busses. The outputs of this bank of bus receivers are applied to serial inputs of the bank of shift registers 852 and associated latches 854. There is one shift register 852 and associated latch 854 for each of the individual TDM busses within TDM network 210. Shift registers 852 function as serial-to-parallel converters that continually shift in a slot of PCM digitized audio and convert it to 8-bit wide parallel output format.

The data latched by latches 854 is multiplexed in sequence to the address input of lookup table 856 at a bit clock rate that is a multiple of the TDM bus slot timing. Blocks 856–860 are all synchronized to operate at this rate. The parallel output of one latch 854 at a time is enabled onto a multiplexed address bus 855 (the multiplexing being performed under control of a counter 859 clocked at the bit clock rate described above). Thus, incrementing counter 859 from zero to a maximum value will cause the TDM bus data corresponding to the sequence of TDM bus slots be to applied to the address input of table 856. The signals carried by multiplexed address bus 855 are used to address lookup table 856 which performs a linearizing function to map a digitized representation (e.g. µlaw) applied to its address input into a linear digitized representation.

The linear output of lookup table 856 is applied to one input of multiplier/accumulator 860 operating in synchronism with the bit clock (and thus with the multiplexed address bus 855). Another input of the multiplier/accumulator 860 receives an 8-bit weighting signal provided by the output of slot/bus weight lookup table 858. Lookup table 858 may be a 256×8 bit RAM addressed by the output of counter 859 (the address information provided by the counter encoding TDM bus number and TDM slot number). The address supplied to lookup table 858 thus specifies a particular location within the lookup table corresponding to a TDM bus number/slot combination.

Once per TDM bus frame, multiplier/accumulator 860 provides a summation output to the input of digital range checker/limiter 862. Range checker/limiter 862 checks the magnitude of the summation output and, if necessary, substitutes a predetermined maximum output value for any value exceeding the dynamic range of DAC 864. DAC 864 converts (at the TDM slot rate) the output of range checker/limiter 862 into an audio signal and provides the analog output to scaling, filtering and tone generation block 866. Block 866 buffers and bandpass filters the output of DAC 864 and provides the filtered, scaled output to line termination circuit 868 for application to the associated RF repeater transmitter audio input via audio link 402(1)-OUT.

Console operators typically wish to listen to many groups simultaneously over the same "select" loudspeaker. The same architecture described above is used to accomplish this result. For CIMs, the audio channel output 402(1)-OUT is provided to an audio amplifier and associated console "select" loudspeaker. In the case of CIMs 204, controller 410 may be programmed with a database containing multiple group numbers. Thus, each time a slot assignment message specifying one of the group numbers in the database is transmitted over message network 209, the CIM controller 410 writes a non-zero weighting factor WF into its associated table 858. However, generally unlike the weight lookup tables 858 of MIMs 203 (which typically will have only a few non-zero entries at any given time), CIM weight lookup tables may have many tens of non-zero entries to permit multiple TDM channels corresponding to multiple sites and multiple groups to be summed simultaneously for easy monitoring by the console operator.

Further detailed description of the audio section 800 is set forth in commonly assigned U.S. patent application Ser. No. 07/658,636 entitled "Audio Routing Within Trunked Radio Frequency Multisite Switch" filed on Feb. 22, 1991 and incorporated herein by reference.

To allow entities such as dispatch console operators and landline telephone subscribers which lack digital encoding and decoding capabilities to participate in encoded (e.g. encrypted) communications in a multisite network, the present invention provides one or more digital voice interface module(s) 250 (DVIM) as a component of the multisite switch. The DVIM module 250 permits one or more dispatch consoles 202 and/or landline telephone subscribers to process both digitally encrypted audio as well as unencrypted audio. It will be understood that for purposes of the present invention, the term "audio" includes both voice and data communications. As a result of the present invention, a console dispatch operator and a landline telephone subscriber can transmit and receive digitally encoded calls over the multisite network. Although much of the description of the invention is directed to digital encryption/decryption, those skilled in the art will appreciate that the present invention applies to digital communication encoding/decoding processes in general.

Typically, digital radio units in the site areas have the capability to transmit encrypted or unencrypted communications merely by selecting that feature from their radio. Control circuitry within the radio unit includes an encryption "key" which is used to encrypt the digitized audio information before it is transmitted over the RF link to the corresponding site controller. The site controller demodulates the digitally encrypted audio information and transmits that information by way of a conventional 9600 bit per second modem over the telephone line (indicated as audio/data channels in FIG. 2) to its corresponding MIM. The MIM then places a control message on the message bus 209 to indicate both an active call and that the call is encrypted. The encrypted digital information modulates the analog carrier transmitted by the modem over the telephone line. The modem signal is processed in a corresponding audio section 800 (i.e., sampled, compressed and digitized into PCM words and transmitted over the audio network 210 in the preassigned TDM bus slot).

The digitized information on the audio bus 210 is encrypted. CIMs 204 and the CTIM 207 (as well as any other interface module in switch 200) lack encryption or decryption capabilities. Landline telephones and console operator stations also lack encryption/decryption capabilities. Consequently, landline subscribers and console operators are typically unable to participate in or originate encrypted communications. The DVIM(s) 250 of the present invention overcome this limitation and provide digital encoding/decoding capabilities such as encryption and decryption directly at the switch 200 to console operators, land line subscribers, and other users who lack these capabilities. Accordingly, those operators, subscribers and other users do not require digital communication circuitry or software to be added to their respective communication units to participate in digitally-based calls. Another advantage of the present invention is the switch 200 does not require substantial modification to incorporate the DVIM(s) 250 since architecturally (and to a large extent operationally) the DVIM is like the other interface modules.

Figure 7:
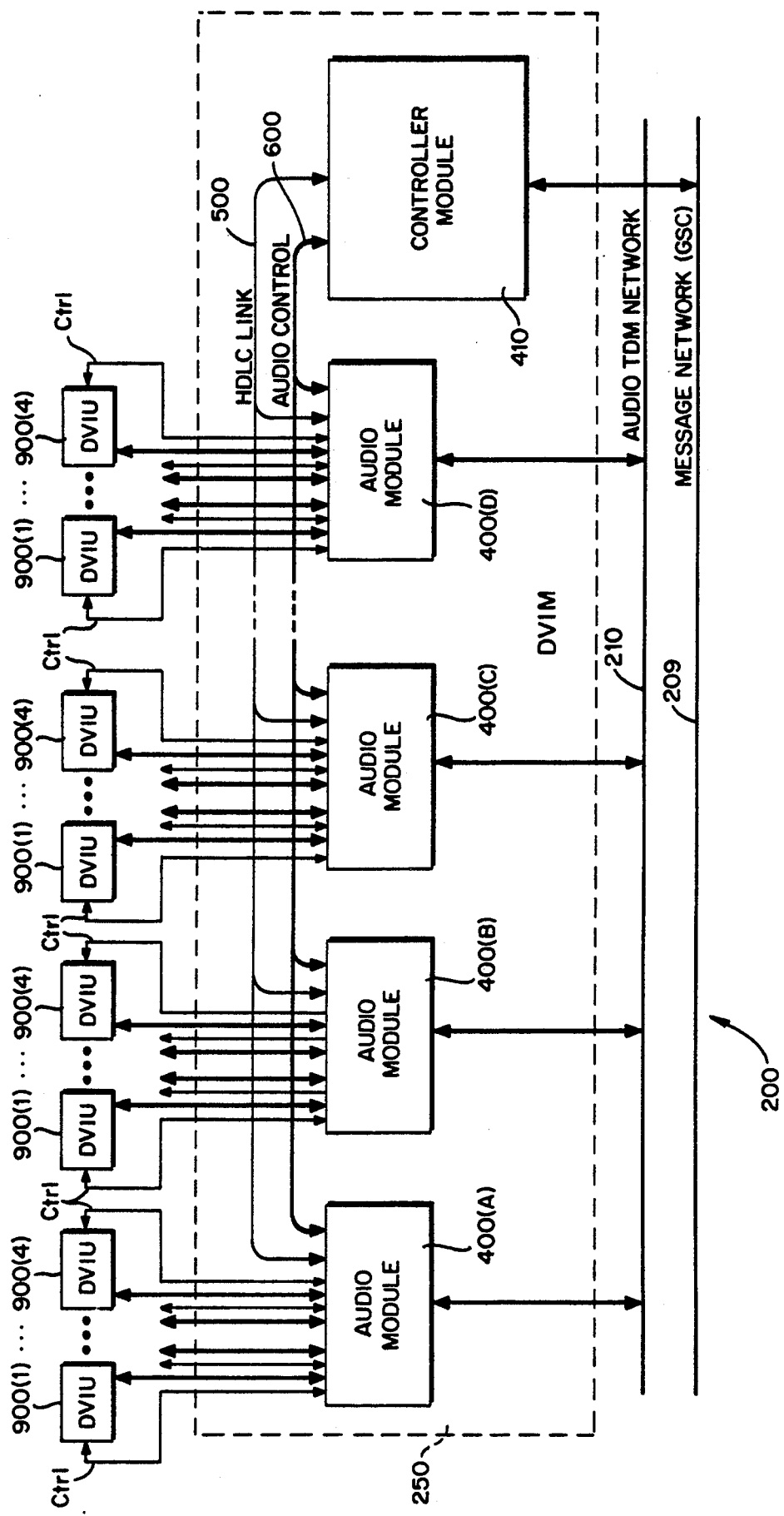
FIG. 7 is a block diagram of a digital voice interface module (DVIM)

Referring to FIG. 7, the architecture of DVIM 250 (similar to the MIM module described in detail above) includes a controller module 410 and up to eight audio modules 400 which are connected to the controller via audio control bus 600 and HDLC link 500. The architecture and operation of each audio module 400 is consistent with that described above in conjunction with FIGS. 5 and 6. However, the individual audio/data channels (typically 4) of DVIM audio modules 400 connect to corresponding digital voice interface units (DVIUs) 900. Each DVIU 900 also receives a control signal (Ctrl) from the audio module 400 for controlling whether that DVIU operates in an encryption mode or a decryption mode.

Figure 8:
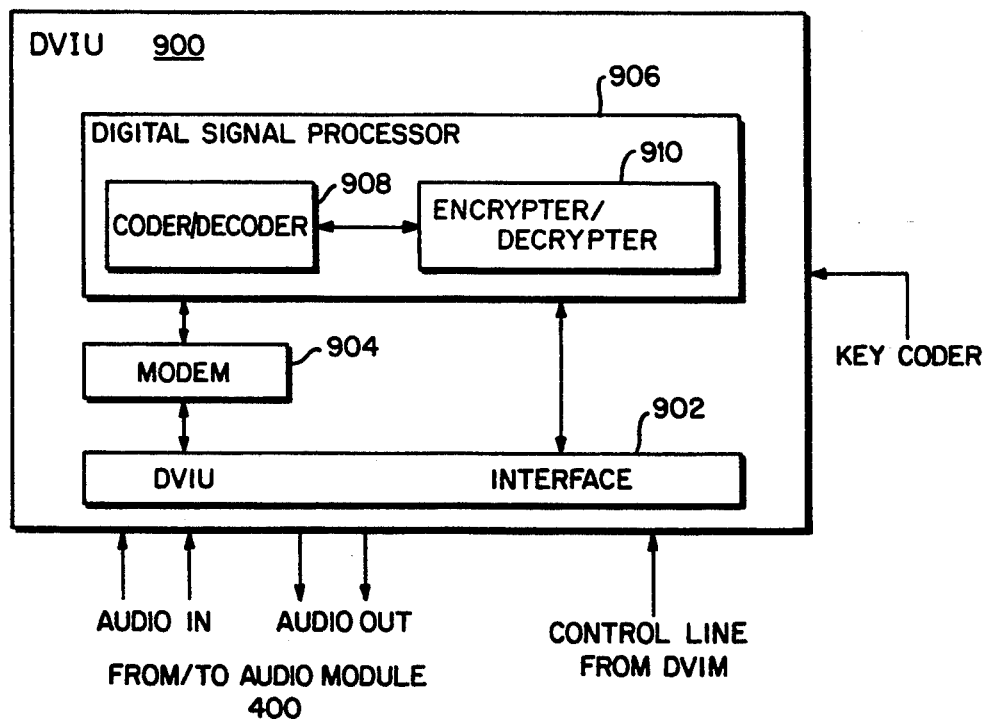
FIG. 8 is a detailed block diagram of an exemplary digital voice interface unit (DVIU) shown in FIG. 7.

FIG. 8 illustrates the elements of an individual DVIU for implementing the present invention 900 and includes a DVIU interface 902, a modem 904, and a digital signal processor 906. Digital signal processor 906 includes a coder/decoder unit 908 and an encrypter/decrypter unit 910. Each DVIU 900 is preprogrammed with an encryption/decryption "key" which may be externally input by a key coder and stored in the encrypter/decrypter 910. Any suitable encryption/decryption algorithm may be used including the public DES (Data Encryption Standard) which employs a sixty-four bit cryptographic key or other proprietary encryption/decryption algorithm such as VGE. The coder/decoder 908 performs conventional coding processes including digitization and compression of input analog signals into digital output signals and conventional decoding processes where digital data is expanded and converted back to analog format.

In general, a DVIU receives an input audio signal from a balanced pair (i.e. a telephone line) and performs the appropriate coding and encryption processes or decryption and decoding processes (to be described in more detail below) in accordance with its preprogrammed key and the control signal from the DVIM.

In addition to tracking call requests and channel assignments, updates and idles for the other interface modules in its corresponding data base as described above for the MIM interface module, each DVIM also tracks call requests for encrypted/decrypted communications (e.g. from a console) as well as DVIM TDM bus slot channel assignments, updates and idles.

Each DVIM supports multiple communication channels with each channel having its own DVIU and cryptographic key. In addition, multiple DVIMs may be supported for each switch (for example up to four DVIMs per multisite switch). Each DVIM is assigned an identification (ID) number and the DVIMs communicate over the message bus 209 which DVIM is handling a particular call. An available DVIM with the lowest ID is assigned the call. If all DVIMs are busy, the call cannot be processed.

Each channel supported by a DVIM requires its own TDM bus slots on the audio network 210 (in addition to those TDM bus slots established by the MIMs, CIMs, etc.). Each DVIM 250 supports both dedicated and dynamic channels. For a dedicated channel allocation, a specific DVIM channel and a corresponding DVIU is dedicated for example to a particular group of radio units serviced by the multisite switch. A dedicated channel always processes calls assigned to that channel. Agency, fleet or group calls may be assigned to their own dedicated DVIM channel. For example, an agency may be assigned to dedicated channel 1 of the DVIM, and a group Y within that agency may be assigned to dedicated channel 2 of the DVIM. The agency X calls will always be encrypted/decrypted by the DVIU connected to channel 3 of the DVIM and the group Y calls will always be encrypted/decrypted by the DVIU connected to channel 2. The two dedicated DVIUs may (and likely do) have different cryptographic keys.

DVIM dedicated channels are initially assigned by the MOM PC 252 which identifies and maps the unit/group to a particular DVIM, DVIM channel, and its corresponding dedicated DVIU. The MOM PC 252 also identifies other nondedicated channels supported by each DVIM, and a data base of this information is maintained in the RAM of the DVIM. TDM bus slots (i.e., channels) for the DVIMs are allocated by the MOM PC in the same fashion that such slots are assigned for MIM and CIM interface modules nodes as described above.

Nondedicated DVIM channels can also be dynamically allocated. For encrypted calls that are not assigned to dedicated channels, the DVIM "dynamically" assigns that call to a first available nondedicated channel (and hence its corresponding DVIU). This mode of operation requires that all dynamically allocated channels use the same cryptographic key within the same dynamic pool. Thus, multiple pools of DVIM channels (and the corresponding DVIUs) may be assigned to a particular user/group where each DVIU in those pools includes the same cryptographic key. For multiple dynamic channel pools, the call is assigned to the first available non-dedicated channel of the pool to which the call is "based," i.e., the group to which the caller placing the call is logged. If the caller is logged into Group 1, then the call will be assigned to the pool to which Group 1 belongs. The mapping of groups to DVIM's and DVIU pools is performed at the MOM PC.

Another further embodiment of the present invention includes dynamic keying. Rather than manually inputting cryptographic keys into the DVIUs using a key loader, DVIU channels and cryptographic keys can be assigned and loaded in real time over the message bus 209 by the MOM PC so that channel resources are optimally allocated. This latter embodiment permits cryptographic keys to be changed frequently and easily to provide additional security.

Figure 9C:
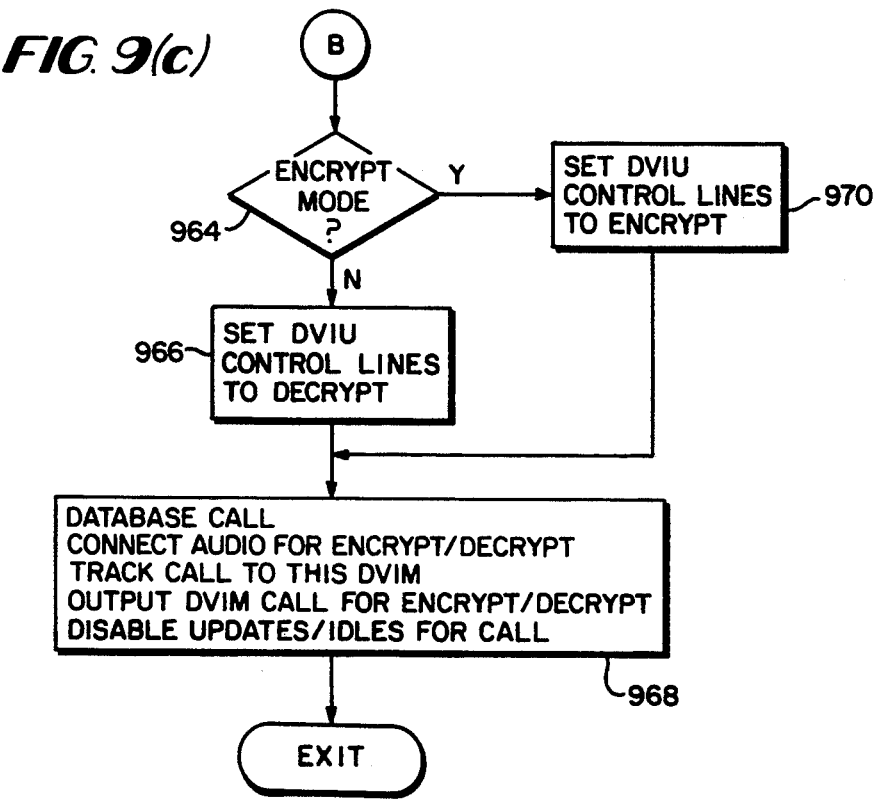
FIGS. 9(a)–9(c) are flow diagrams outlining processing procedures followed in accordance with the present invention.

The process flow for handling digital communications in each DVIM will now be described in conjunction with FIGS. 9(a)-9(c). In order to assist in understanding the flow charts in FIGS. 9(a)-9(c), the following acronyms and call definitions are used to define the type of call being placed as it exists on the GSC message bus 209 and the TDM audio network 210.

CV—Clear Voice (i.e. a standard group/unit call).
VG—Voice Guard (this simply designates that the call is in a digital format as in the case of an encrypted call).
VGCV—Voice Guard Clear Voice (this refers to a digital call which has been converted to clear voice format, e.g. a decrypted digital/encrypted call from a DVIM, a console placing a digital call, or a landline user placing a digital call).

Call definitions:
(1) Radio originated CV call.
   This call originates from a radio unit and because it is in the CV mode, no DVIM is required to process it. Other interface modules, e.g. CIM's, MIM's, etc., may track the callee/caller of this call.
(2) Console originated CV call.
   This call originates from a console and because it is in CV mode, no DVIM is required to process it.
(3) Radio originated VG call.
   This call originates from a radio unit in the VG digital format and therefore needs to be decrypted. A DVIM processing this call produces a VGCV call with the decrypted output from the selected DVIU. CIM's tracking the callee/caller of this call use the VGCV call for processing since console interfaces operate in CV mode. Secondary MIM's (and NIM's) tracking the callee/caller of this call use the original VG call from the originating MIM to prevent unnecessary decrypt/encrypt operations by the DVIM(s).
(4) Console originated VG call.
   This call originates from a console dispatcher and is placed onto the GSC data network in VGCV mode. Since consoles operate in CV mode only, the CIM associated with this console outputs a VGCV call onto the data bus indicating that a DVIM must encrypt this VGCV call. One of the plural DVIM's processes this call and produces a VG call with the encrypted output of the DVIU. Secondary CIM's tracking the callee/caller of this call use the original VGCV call for processing (again due to the fact that the consoles operate in CV mode only). All MIM's and NIM's use the DVIM VG call for processing in order to produce the appropriate digital messaging to the trunked site/radio.
(5) Radio originated VG landline call
   This call originates from a radio unit in VG digital mode and therefore must be decrypted by a DVIM. A DVIM processes this call and produces a VGCV call from the selected DVIU output. The CTIM processes the VGCV call, and the CTIS interface connected to the CTIM responds with a channel assignment for the radio originated call. Audio for this call is then connected (ringing tones will occur at this point, both at the radio and at the landline phone being called). The CTIS then produces another channel assignment, in VGCV mode, for call back purposes to produce the full duplex link. The CTIS must output a VGCV call since landline interface is CV analog mode only. The DVIM then processes this VGCV landline call back and outputs a VG call from the encrypted output of a selected DVIU. The originating or primary MIM processes this VG call back and sends the channel request to the site whereupon the full duplex link at the site is connected to the radio.
(6) Landline originated VG call.
   This call originates from a landline user and is placed onto the bus in VGCV mode by the CTIM, since the landline interface operates in CV mode only. A DVIM processes this call and outputs a VG call from the encrypted output of the selected DVIU. The MIM(s) tracking the callee of this call process the DVIM VG call and output a call request to the interfaced site(s). The site responds with a channel assignment to create audio connections from landline user to the site and ringing tones at radio(s). When a radio calls back (full duplex), the MIM outputs a VG call onto the data bus. A DVIM processes this call back and generates a VGCV call from the decrypted output of a selected DVIU. The CTIM who originated the call processes the DVIM VGCV call and outputs VG call request to CTIS. CTIS responds with VG channel assignment and all audio connections are made. Ringing tones are halted since radio has called back indicating call receipt. All digital/encrypted landline calls in (5) and (6) are "CONFIRMED". This means that if any of the above call sequence does not occur, the site is informed of a "Confirmation Failure" and the call is dropped.

Thus, for every digital/encrypted (VG) call placed on the bus, there is an equivalent or matching non-digital/decrypted (VGCV) call. For every VGCV call there is an equivalent VG call. In calls involving the landline interface CTIS, there are two VG's and two VGCV's to implement full duplex operation.

Multiple DVIM's allow the multisite switch 200 to handle more digital calls at one time as well as make it more fault tolerant. If one of the DVIM's crashes, another DVIM will take its place as well as its responsibilities. Since multiple DVIM's exist, an important processing task for each DVIM is to determine whether the VG or VGVC call is an originating call that must be processed, or an output from another DVIM that has already processed the originating call. That (and other) processing tasks are now described starting with FIG. 9(a) which describes the general process by which the caller, callee(s), type of call (digital/encrypted and non-digital/unencrypted), and DVIM are identified.

A determination is made in block 920 to filter out the clear voice (CV) calls as defined in (1) and (2) above. If it is a clear voice (CV) unencrypted call, a DVIM is not required to process the call. DVIM channel updates/idles typically monitored for VG/VGCV calls are disabled (block 922) to avoid unnecessary processing, and the CV call is processed as described above in conjunction with FIGS. 1-6. If the call is not clear voice, a decision is made whether the call is currently digitally encrypted, e.g. in VG mode, (block 924). If it is, a determination is made whether the digitally encrypted (VG) call involves a landline subscriber (block 926). If the VG call involves a landline call and the call is radio originated as described in call definition (5) above, then this DVIM must determine if it is the appropriate DVIM to process the call in function block 944 in FIG. 9(b). If the call is not radio originated, then another DVIM is encrypting the landline portion of the call. This DVIM tracks the call and then disables updates to prevent unnecessary processing in the future (block 930). This DVIM tracks this call for one reason—to detect when the DROP message for this call occurs. The DVIM who tracks the call to itself will then process the DROP message.

Returning to decision block 926, if this VG call does not involve a landline subscriber, a determination is made in block 932 whether the call originates from a console. If the VG call is console originated, then the call must be from another DVIM since the originating CIM of this call output a VGCV call from the console as described in call definition (4) above. This DVIM first tracks the call and then disables updates associated with this call to prevent unnecessary processing as described above for block 930. If the VG call is not console originated, then it must be radio originated as described in call definition (3) above. At this point, the DVIM determines if it is the appropriate DVIM to process the call and therefore directs control to block 944 in FIG. 9(b).

If the call is neither clear voice nor digitally encrypted, a decision is made in block 934 whether the call is a decrypted digital call, i.e. VGCV as described above. If not, control defaults to block 942 and updates/idles are disabled. If the call is a VGCV call, control proceeds to decision block 936 where a determination is made whether the call involves a landline connection. If the VGCV call involves a landline subscriber and the call is landline originated as determined in block 938, then the DVIM must determine if it is the appropriate DVIM to process this call, (to be described in conjunction with block 944 (FIG. 9(b)), since the landline interface CTIM operates in CV mode. If the call is not landline originated, then another DVIM is decrypting the radio originated VG landline call. This DVIM tracks the call and then disables updates for this call to prevent unnecessary processing in the future (block 930).

If the VGVC call does not involve a landline connection, control proceeds from block 936 to block 940 to determine whether it was a console originated call. If the VGCV call is console originated, then this is the originating CIM's call as described in call definition (4) described above. Control is passed to block 944 (in FIG. 9(b)) for the DVIM to determine if it is the appropriate DVIM to process this call. If the VGCV call is not console originated, then it must be from another DVIM processing a radio originated call as described in the call definition (3) above. This DVIM tracks the call and then disable updates for it to prevent unnecessary processing (block 930).

Figure 9A:
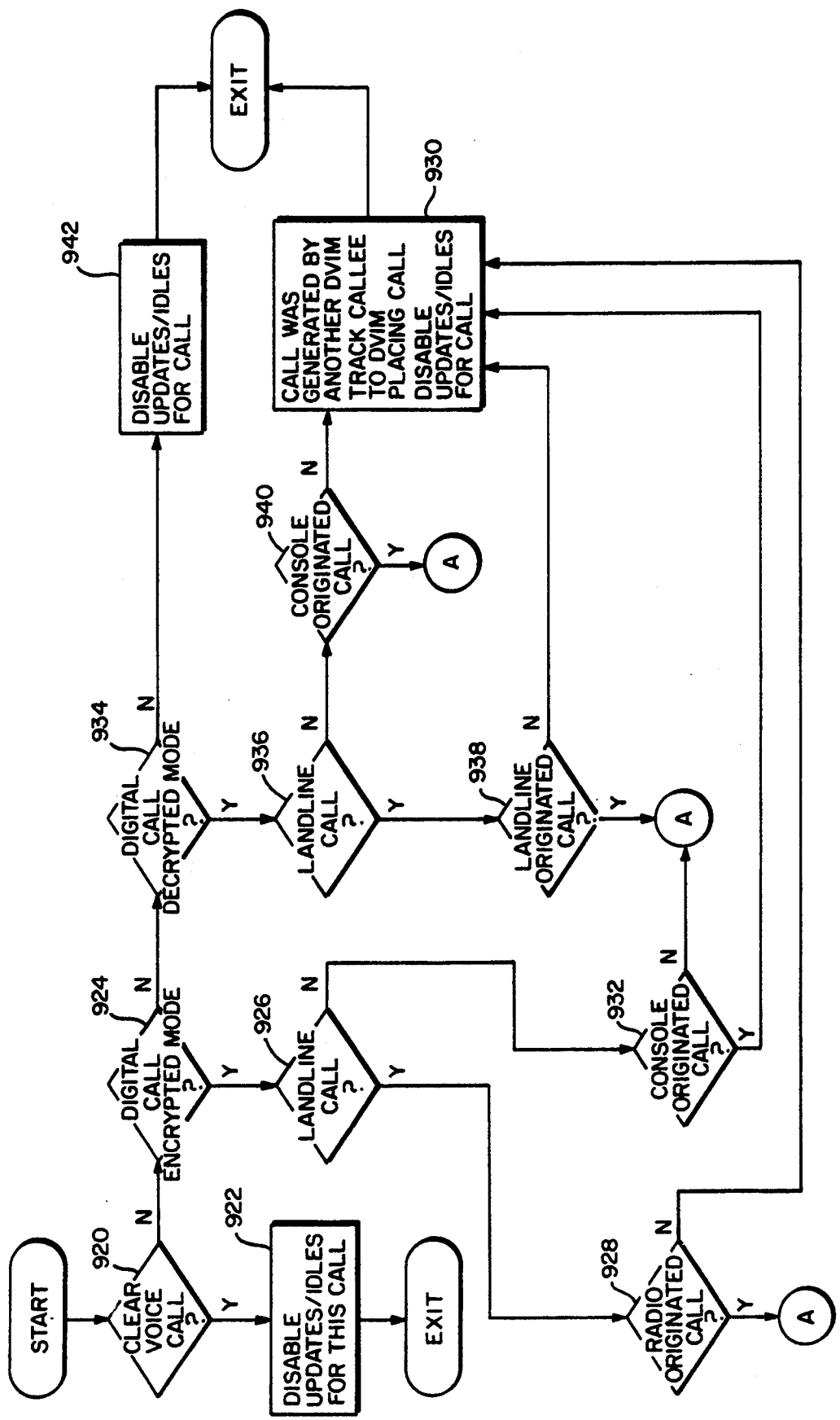
Figure 9B:
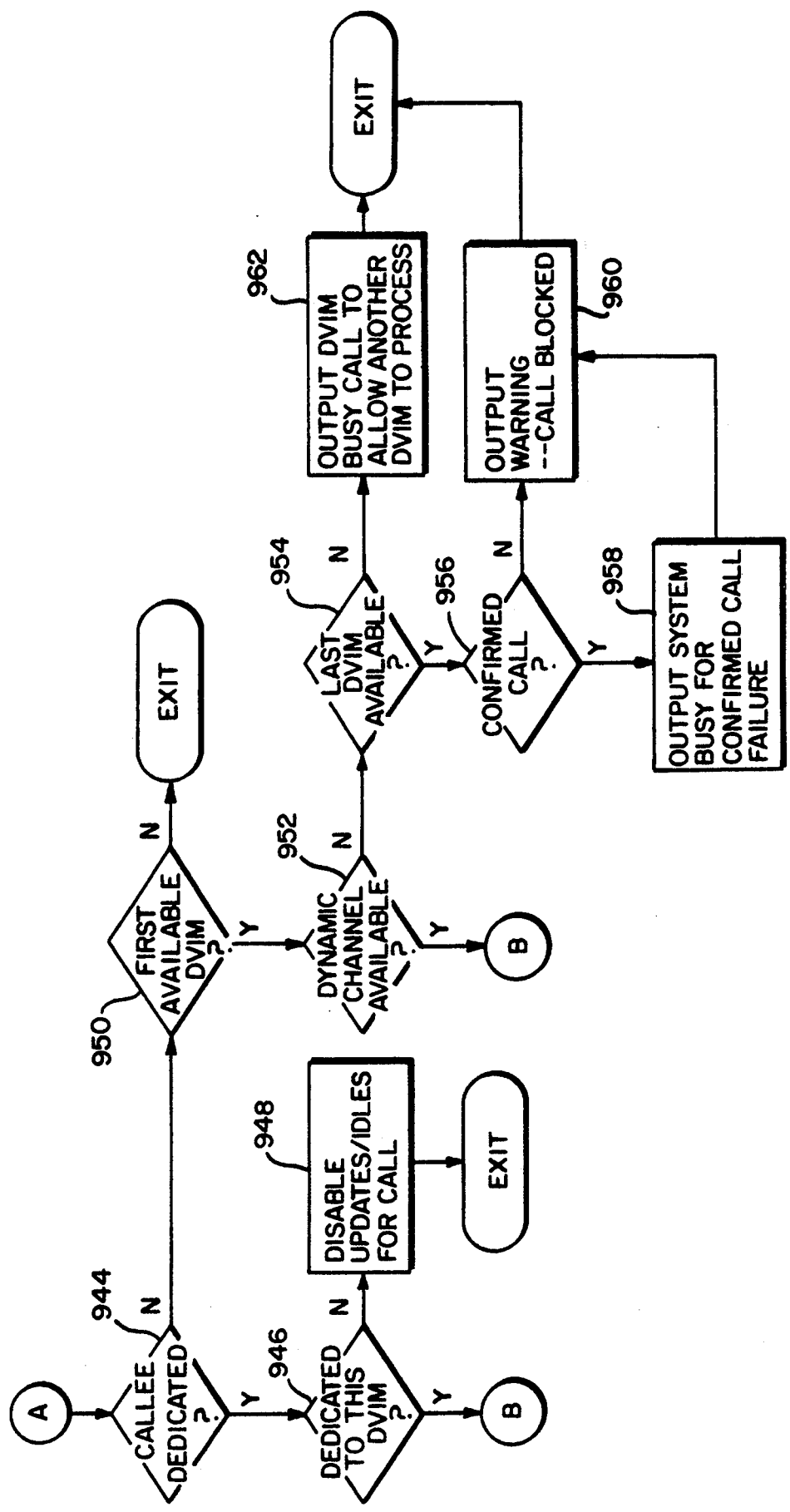

Once this DVIM has determined that it must process this call as described in FIG. 9(a), a decision is made in block 944 whether the callee has been preassigned by the MOM PC to a dedicated channel (as opposed to a dynamic channel). If so, a decision is made in block 946 whether the callee is dedicated to this particular DVIM. If not, this DVIM disables the update and idle tracking for this call in block 948. Otherwise, control proceeds to FIG. 9(c) meaning that this DVIM will process the call and all other DVIMs will ignore it. If the callee is not dedicated, control proceeds to decision block 950 to determine if this DVIM is the first available DVIM (i.e., the DVIM with a lowest identification code). If the first DVIM is not available to process the call, control exits to the DVIM with the next lowest ID and so forth. If it is the first available DVIM, the decision is made in block 952 whether a dynamic channel is available. If so, control proceeds to FIG. 9(c) meaning that this DVIM will process the call and other DVIMs will ignore it. If not, the decision is made whether this is the last DVIM (block 954). If so, the call therefore is blocked. A decision is made in block 956 whether this is a confirmed call. If not, a warning is output that the call cannot be processed (block 960). If the call is confirmed, a busy signal is also output to indicate a confirmed call failure (block 958). If this DVIM is not the last available DVIM, a DVIM busy call is output onto the control message network 209 to permit the next numbered DVIM to process the call (block 962).

When the current DVIM has an available channel, processing proceeds as described now in conjunction with FIG. 9(c). At decision block 964, calls which are to be encrypted (i.e. calls from the console or the landline network) are processed in block 970 to set the corresponding DVIU to encrypt the communication using its corresponding encryption key). Otherwise, the DVIU is set to decrypt in block 966. In block 968, the DVIM call tracking data base is updated to indicate that this call communication requiring encryption/decryption has been tracked to this particular DVIM for processing. A control message is output over the message bus 209 from this DVIM to all other DVIMs to disable their updates and idles for this call.

Exemplary operation of the present invention will now be described first in the context of a digitally encrypted communication from a radio unit to a console operator, and then a communication to be encrypted from the console operator to the radio units. It should be appreciated that the present invention may be similarly used to process digital communications for landline telephone subscribers and any other subscriber lacking digital encoding/decoding communication capabilities.

Assume that the subscriber sets his radio for encrypted communications so that when keyed it transmits digitally encrypted data to its site 102. Site 102 then transmits this digitally encrypted information by way of a 9600 bps modem over the audio data channel (a telephone line) as indicated in FIGS. 2 and 3. The modem modulates an analog carrier such that the transmitted signal is within the bandwidth of the telephone line, typically 300–3300 Hz. The MIM processes the modem output as described above in conjunction with FIG. 6 to digitize the analog carrier which was modulated with the digitally encrypted audio from the radio unit and place it on the preassigned TDM bus slot on audio network 210. A message is placed on the message network 209 to request a set up of the communication and to identify (among other things) the caller, callee(s), group, and the fact that the communication is encrypted.

Assume that the console is programmed to monitor communications of this radio unit (and its group). After alerting the console operator of the call, the CIM does not connect the primary MIM's TDM one slot to the console as it would for a clear voice call. Instead, the console CIM monitors the message bus and recognizes that the communication is encrypted and waits for the DVIM to process the call audio information. The DVIM, which also has been monitoring the control message bus, recognizes that the console is programmed to monitor calls to/from this radio unit/group, and retrieves the digitized modem information from the MIM TDM audio bus slot to decrypt it and permit the console operator to monitor the communication.

The information from the MIM assigned TDM bus slot is converted in the DVIM back into analog format (using the interface module circuitry described in the lower half of FIG. 6). Thus, the output from the DVIM is actually the reconstructed carrier wave modulated with the digitally encrypted information originally output from the site modem. The DVIM selects the appropriate DVIU having the corresponding cryptographic key to decrypt this communication and sends a control signal (Ctrl) to that DVIU commanding it to decrypt. The audio input from the DVIM is received at a conventional modem 904 via the DVIU interface and demodulated to retrieve the digitally encrypted audio information. The modem output is received by the digital signal processor 906 and decrypted in the decrypter unit 910 using the appropriate crytographic key. The decrypted digital output is then decoded in decoder 906 meaning that the coded audio (which was previously compressed in the originating radio) is expanded and converted into a corresponding analog audio signal.

The analog audio signal is then returned to the DVIM through the DVIU interface 902 over the audio out signal lines. The DVIM digitizes that analog audio and outputs the digitized signals onto the DVIM assigned TDM bus slot set up initially on audio bus 210 for that DVIM channel. When that information is put onto the audio network by the DVIM, the DVIM also outputs a message on the message network 209 to signal the CIM to retrieve the decrypted information from the DVIM TDM bus time slot. The CIM corresponding to the dispatch console retrieves digitized information in that DVIM bus slot and converts the digitized information into an analog audio. The analog signal is then output to the dispatch console 202 to drive the selected speaker at the console so that the console operator can monitor the encrypted communication.

The DVIM permits a console operator to monitor a radio unit originated digitally encrypted communication without requiring the dispatch console to have dedicated hardware and software to perform the encryption and decryption. Moreover, the present invention preserves the existing hardware and software architecture of the multisite switch 200 so that no significant modifications need be made to the switch. The distributed modular nature of the multisite switch allows the DVIM to adopt the interface module architecture and processing capabilities of the MIMs, CIMs, etc. to provide the encryption/decryption capabilities for subscribers and operators lacking these types of desirable and increasingly more common digital communications features.

The operation of the present invention for encrypting a console originated communication and transmitting to a particular radio unit or group at one or more sites will now be described. The console operator selects (e.g. using a button at the console) an encrypted communications format and initiates a call to a particular radio unit or group. The unencrypted analog audio from the console microphone is digitized in the corresponding CIM 204 and placed on preassigned TDM bus slot on audio network 210. At the same time, a message from the CIM is output onto the message network 209 indicating among other things the callee and the fact that this communication is to be encrypted. That fact is detected by one of the DVIMs monitoring the message network 209. In "dynamic" operation, the "lowest" available DVIM retrieves the digitized audio from the audio network 210 and converts the information back to analog audio. If the callee is "dedicated", however, the DVIM to which the callee is dedicated processes the call.

The DVIM selects the appropriate DVIU having the cryptographic key corresponding to the radio unit and/or group to which the console operator wishes to communicate. A control signal (Ctrl) from a DVIM places the DVIU 900 into an encrypt mode. The analog audio is input from the audio input terminal through DVIU interface 902 to the DSP 906. The analog audio is digitized (and compressed) in coder 908 and encrypted in the encrypter unit 910 using the preassigned cryptographic key. The encrypted digital information from encrypter unit 910 is then used to modulate an analog carrier in modem 904, and the modem output is sent back to the DVIM through the DVIU interface 902. The DVIM digitizes the modulated analog carrier generated by the modem and outputs the digitized information on the TDM bus slot preassigned for the DVIM along with an appropriate control message.

The corresponding MIMs for the radio unit(s)/group(s) to receive the console originated call monitoring the control network detect that message and retrieve the information from the corresponding DVIM TDM bus slot. The MIM(s) regenerates from the retrieved digital information the analog modem carrier signal which is then transmitted over the appropriate audio/data channel (from the MIM) to the necessary site(s) 102. The modem in the site(s) demodulates the carrier to retrieve the encrypted digital information and then transmits the information to the radio units via modulated RF carrier. The radio units which have modulation/demodulation and encryption/decryption circuitry then demodulate and decrypt the communication to drive a speaker in the radio unit.

In addition to permitting a console operator to participate in digitally based communications (e.g., digitally encrypted audio communications), the present invention permits a console operator to select and/or patch together multiple conversations including not only different groups of encrypted communications but also different units/groups involving both encrypted and unencrypted audio. Since the audio which is ultimately routed to the console operator through its corresponding CIM is decrypted by the DVIM/DVIU in the multisite switch, the audio summing circuitry described above in conjunction with FIG. 6 can be used without modification to handle both encrypted and unencrypted communications.

Although the above example is described in conjunction with communications to and from the console operator, the same essential hardware and operation apply to calls to and from landline subscribers. Land-based telephone calls are handled by the centralized telephone interconnect system (CTIS) 212 and are interfaced with the multisite switch 200 via the centralized telephone interconnect module (CTIM) 207. The CTIS 212 employs the same architecture as a site 102 or dispatch position 202 including analogous audio/data channels and control downlink wires to the CTIM 207.

A landline subscriber can participate and initiate an encrypted communication with radio units/groups in the field using the DVIM and DVIU architecture in much the same manner as a console operator as described above. A landline subscriber simply dials the access number to the trunked communication system and then dials the group or individual number. If the conversation is to be digitally encrypted, the subscriber then presses a single key on the telephone keypad, for example a pound sign (#), before he dials the group or individual unit ID. For example, if a clear voice call to radio unit 123 would be dialed simply by pressing digits 00123, an encrypted call to radio unit 123 would be initiated by dialing #00123. The # sign indicates to the DVIM that encryption is necessary and the landline subscriber speech is encrypted in the same manner as described above. When a landline subscriber sends a signal to the multisite system to initiate an encrypted interconnect call or responds to an encrypted call, the multisite switch 200 treats this message as a confirmed call and performs the necessary confirmation tracking. When the landline subscriber initiates a digital call, the call back (for full duplex operation) must also be digital as required by the confirmed call process within the CTIM. If the landline subscriber receives a digital call, it must respond with digital call backs as required by the confirmed call process within the MIM.

Unlike half-duplex communications typically used in trunked RF communications systems, landline telephone communications are full duplex. Therefore, each encrypted call to/from the CTIS involving a landline subscriber requires two DVIUs—one for the radio and one for the landline. Accordingly, another set of DVIM TDM bus slots is required for landline calls as compared with calls only involving radio units and console operators. Thus, it is often necessary to have multiple DVIMs in order to provide sufficient digital call handling, capability particularly for landline calls. Each switch 200 supports up to four DVIMs (128 DVIUs). Additional digital call handling capacity can be obtained via the NIM 252 connections to other switches.

While particular embodiments of the present invention have been described and illustrated, it should be understood that the present invention is not limited thereto since modifications may be made by persons skilled in the art. The present invention contemplates any and all modifications and equivalents that fall within the spirit and scope of the underlying invention disclosed and claimed herein.

What is claimed is:

1. A communications system, comprising:
   one or more digital communication units for conducting digital communications;
   one or more analog communication units for conducting analog communications; and
   a digital switch including:
   a time division multiplex (TDM) bus for transferring digital information between dedicated interface modules and one or more digital interface modules connected to the bus during preassigned time slots, wherein the dedicated interface modules interface communications between the TDM bus and the digital and analog communications units, and the one or more digital interface modules interface the analog communication units in digital communications with the digital communications units.

2. The communications system according to claim 1, wherein the digital communications include digitally encrypted audio information.

3. The communications system according to claim 2, further comprising:
   digital interface units connected to each digital interface module, wherein each digital interface unit includes:
   means for encrypting information originating from the analog units, and
   means for decrypting information from the digital units.

4. The communications system according to claim 3, wherein each digital interface unit includes a predefined cryptographic key for encrypting or decrypting communications information retrieved from the TDM bus by the digital interface unit via a corresponding digital interface unit.

5. The communications system according to claim 3, the digital switch further comprising:
   a message control bus for transferring control signals between all interface modules to set up and take down communication paths through the digital switch over the TDM bus,
   wherein the one or more digital interface modules includes means for monitoring the message control bus to detect when an analog communication unit is to transmit or receive encrypted communications and assigning a digital interface unit to the encrypted communication to interface the analog communication unit in encrypted communications.

6. The communication system according to 3, wherein each digital interface unit includes a digital signal processor including:
   means for storing a cryptographic key;
   means for selectively encrypting information from the analog communication units retrieved from the TDM bus by a corresponding digital interface module using the cryptographic key; and
   means for selectively decryting information to be received by the analog communication units via the corresponding digital interface module and TDM bus using the cryptographic key.

7. The communications system according to claim 2, wherein the analog communication units include telephone sets of landline telephone subscribers and wherein a landline telephone subscriber initiates and receives encrypted communications using the one or more digital interface modules by pressing a single key on the subscriber's telephone set.

8. The communications system according to claim 1, wherein each dedicated interface module includes:
   means for digitizing communications received from the analog and digital communications units and placing the digitized information on the TDM bus during a corresponding preassigned time slot, and
   means for retrieving digitized information during particular time slots and converting the retrieved information into a format for communication with the analog and digital communications units.

9. The communications system according to claim 1, wherein the analog communication units include one or more dispatch units for monitoring communications involving digitally encrypted audio information from one or more digital communication units using the one or more digital interface modules.

10. The communications system according to claim 9, wherein the dispatch unit monitors multiple communications on a single speaker by summing communications involving groups of analog and digital communication units.

11. The communications system according to claim 1, wherein the digital communication units include mobile or portable radio transceivers.

12. The communication system according to 1, wherein the one or more digital interface modules dedicates time slot channels for digitally encrypted communications involving an analog communication unit and groups of digital communication units.

13. The communication system according to 1, wherein the one or more digital interface modules dynamically assigns time slot channels from a pool of available time slots.

14. A digitally trunked radio frequency communications system comprising:
   mobile or portable digitally trunked radio transceivers;
   plural digital repeater sites having corresponding coverage areas and serving mobile or portable digitally trunked radio transceivers disposed within the coverage areas, the radio transceivers supporting digitally encrypted communications; and
   a distributed switch for routing communications between digital repeater sites and analog communication sources and destinations including a digital interface module for encrypting communications originated from an analog communication unit and decrypting encrypted communications to be received by the analog communication unit, wherein the digital interface module permits the analog communication unit to originate and participate in encrypted communications with one or more radio transceivers.

15. The switch according to claim 14, further comprising:
   a plurality of digital interface units connected to the digital interface module, wherein unencrypted information from the analog communications unit is encrypted by one of the plurality of digital interface units under the control of the digital interface module before being transmitted by a digital repeater site to a receiving radio transceiver and information encrypted by a transmitting radio transceiver and intended for the analog communication unit is decrypted by one of the digital interface units under the control of the digital interface module.

16. The system according to claim 14, wherein the analog communications unit includes a dispatch console.

17. The system according to claim 14, wherein the analog communications unit includes a telephone set of a landline telephone subscriber and wherein the landline telephone subscriber initiates encrypted communications by activating a switch on the telephone set.

18. The system according to claim 14, wherein encrypting of communications includes digital encryption with a cryptographic key and decrypting of communications includes digital decryption with a cryptographic key.

19. The system according to claim 18, wherein each digital interface unit is assigned a cryptographic key and corresponds to a communications channel over the distributed switch.

20. The system according to claim 19, further comprising:
   means for dedicating at least one dedicated digital interface unit to a particular radio transceiver or a group of transceivers, wherein encrypted communications conducted via the dedicated digital interface unit and involving at least one analog communication unit are encrypted and decrypted using the same cryptographic key.

21. The system according to claim 19, further comprising:
   means for dynamically assigning an encrypted communication involving at least one analog communication unit to an available digital interface unit from a pool of nondedicated digital interface units.

22. A method where an analog communications unit participates in digitally encrypted communications with digital RF transceivers located in different geographical sites over a distributed time division multiplex (TDM) digital switch, comprising:
   (a) providing each site and the analog communications unit with a corresponding interface to the switch;
   (b) providing a digital interfacing module on the switch;
   (c) routing digitally encrypted communications involving the analog unit through the digital interfacing module;
   (d) digitally encrypting communications routed from the analog unit to the digital interface module; and (e) sending the digitally encrypted communications from the digital interface module to at least one rf transceiver.

23. The method according to claim 22, further comprising:
(f) retrieving from the TDM switch digitally encrypted communications directed to the analog communications unit in the digital interface module,
(g) decrypting the communications retrieved in step (e), and
(h) sending the decrypted communications to the analog communications unit.

24. The method according to claim 23, wherein the analog communications unit is a dispatch console unit.

25. The method according to claim 23, wherein the analog communications unit is a telephone set of a landline telephone subscriber.

* * * * *